(12) United States Patent
Kruchko et al.

(10) Patent No.: US 7,416,221 B2
(45) Date of Patent: Aug. 26, 2008

(54) MULTIPLE FOLD PRODUCT AND METHOD OF MAKING THE SAME

(76) Inventors: Steven N. Kruchko, 3839 Central, Western Springs, IL (US) 60558; David H. Kruchko, 5912 Sunset Ave., LaGrange, IL (US) 60525

( * ) Notice: Subject to any disclaimer, the term of this patent is extended or adjusted under 35 U.S.C. 154(b) by 511 days.

(21) Appl. No.: 10/935,873

(22) Filed: Sep. 8, 2004

(65) Prior Publication Data
US 2005/0057039 A1     Mar. 17, 2005

Related U.S. Application Data

(60) Provisional application No. 60/502,768, filed on Sep. 12, 2003.

(51) Int. Cl.
*B42D 15/00*     (2006.01)
(52) U.S. Cl. .................................... 283/106; 283/34
(58) Field of Classification Search ............. 283/81, 283/94, 101, 105, 106–111; 428/124, 126, 428/203–204, 167, 172, 131–136; 156/299, 156/300
See application file for complete search history.

(56) References Cited

U.S. PATENT DOCUMENTS

| | | | | |
|---|---|---|---|---|
| 2,801,198 A | * | 7/1957 | Veri et al. | 428/203 |
| 3,346,259 A | * | 10/1967 | Froehlig | 273/285 |
| 4,006,048 A | * | 2/1977 | Cannady et al. | 156/90 |
| 4,219,596 A | * | 8/1980 | Takemoto et al. | 428/42.2 |
| 4,526,405 A | * | 7/1985 | Hattemer | 283/81 |
| 4,837,088 A | * | 6/1989 | Freedman | 156/243 |
| 5,063,637 A | * | 11/1991 | Howard et al. | 16/225 |
| 5,085,921 A | * | 2/1992 | Jayarajan | 428/204 |
| 5,207,457 A | * | 5/1993 | Haynes | 283/34 |
| 5,273,432 A | | 12/1993 | White | |
| 5,284,363 A | * | 2/1994 | Gartner et al. | 283/81 |
| 5,364,133 A | * | 11/1994 | Hofer et al. | 283/75 |

(Continued)

FOREIGN PATENT DOCUMENTS

EP     1 333 413 A     8/2003

(Continued)

*Primary Examiner*—Derris H Banks
*Assistant Examiner*—Jamila Williams
(74) *Attorney, Agent, or Firm*—McAndrews, Held & Malloy, Ltd.

(57) ABSTRACT

A multiple fold product includes a relatively rigid substrate, such as paperboard, which has upper and lower surfaces. Slots are selectively cut into the substrate at the desired fold locations. The slots divide the substrate into an array of interconnected rectangular sections that are arranged in horizontal rows and vertical columns and which are interconnected by tabs. A first transparent, flexible sheet of material is mounted on the upper surface of the substrate. The first sheet of material has selected intelligence reverse printed on its lower surface such that the printed material is interposed between the substrate and the first sheet of material when the first sheet of transparent material is mounted on the substrate. A second transparent, flexible sheet of material is mounted on the lower surface of the substrate. The second sheet of material has selected intelligence reverse printed on its upper surface such that the printed material is interposed between the substrate and the second sheet of material when the second sheet of material is mounted on the substrate. Layers of opaque material interposed between the sheets of material and the substrate.

8 Claims, 2 Drawing Sheets

U.S. PATENT DOCUMENTS

| | | | |
|---|---|---|---|
| 5,653,844 A * | 8/1997 | Abrams | 156/277 |
| 5,868,429 A | 2/1999 | Raymond et al. | |
| 5,972,455 A * | 10/1999 | Barry | 428/40.1 |
| 6,063,227 A | 5/2000 | Raymond et al. | |
| 6,165,576 A * | 12/2000 | Freedman et al. | 428/36.91 |
| 6,238,762 B1 * | 5/2001 | Friedland et al. | 428/43 |
| 6,364,364 B1 * | 4/2002 | Murphy | 283/79 |
| 6,569,280 B1 * | 5/2003 | Mehta et al. | 156/275.5 |
| 6,709,726 B1 * | 3/2004 | Dronzek et al. | 428/40.1 |
| 6,924,026 B2 * | 8/2005 | Jaynes | 428/201 |
| 2003/0017312 A1 * | 1/2003 | Labrousse et al. | 428/195 |

FOREIGN PATENT DOCUMENTS

| | | |
|---|---|---|
| GB | 2 275 558 A | 8/1994 |
| JP | 04140133 A * | 5/1992 |

\* cited by examiner

MULTIPLE FOLD PRODUCT AND METHOD OF MAKING THE SAME

RELATED APPLICATIONS

This application is based on and claims priority of U.S. provisional application Ser. No. 60/502,768, filed Sep. 12, 2003, the entire disclosure of which is hereby incorporated by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present application relates to improvements on current designs for rigid folded products such as game boards, maps and charts.

For many years road maps have been printed on paper which is prefolded into a package of convenient size and shape. Typically such folded packages have been rectangular. In the past several years, laminated maps have been developed which have employed a series of rectangular panels joined together in a side-by-side array, but which are foldable into a rectangular package. Such maps have typically folded into a rectangular package which is substantially greater in size (in plan view) than most folded paper maps distributed in the United States. Further, because of the limitations of their design, available folded laminated maps open to a size which is very much smaller than the size of a typical paper map. That severely limits the size of the area to be displayed, or if not the size, then the scale of the area depicted. That means that the opportunity to display details is hampered. Furthermore, available multi-panel laminated maps, by their construction, are long and narrow.

U.S. Pat. Nos. 6,063,227 and 5,868,429, the disclosures of which are hereby incorporated by reference, describe multiple fold laminated products and a method of making such a product. Folding products according to these patents, have multiple, spaced apart rectangular panels which are arrayed in both horizontal rows and vertical columns. Each panel is made up of a central, relatively stiff, paperboard sheet having upper and lower display surfaces and waterproof, transparent upper and lower outer laminating sheets joining all of the sheets into an integrated product. The upper and lower outer sheets are each integral sheets which extend across the paperboard sheets and across the spaces between them. The panels may display selected intelligence, such as maps, words, graphics, and the like. One limitation of the product that the gaps between the panels result in gaps in the map when it is unfolded and viewed. These gaps remove portions of the printed image, limit the size of the maps, are unsightly and distort the accuracy of the product.

Alternatively, it is known to use a larger sheet of paperboard in lieu of the array of smaller rectangular panels that are employed in the aforementioned patents. In such a design, selected intelligence is printed on one or both sides of the paperboard the paperboard is printed with the desired intelligence. Diecut channels are formed in the board at the locations where the folds are to occur. The printed, diecut paperboard is then laminated on both sides with transparent laminating sheets. An example of this type of construction is described in U.S. Pat. No. 5,273,432, the disclosure of which is hereby incorporated by reference. This design results problems similar to those described above in connection with the 227 and 429 patents. Namely, the diecut channels in printed paperboard leave gaps in the map (or other intelligence that is printed on the board). As the map gets larger in size it requires more folds and, as a result, the diecut gaps need to be more frequent and wider. The diecut gaps remove portions of the printed image, limit the size of the maps, are unsightly and distort the accuracy of the product.

BRIEF SUMMARY OF THE INVENTION

According to certain aspects of an embodiment of the present invention, a multiple fold product comprises a relatively rigid substrate having upper and lower surfaces. The substrate preferably comprises a plurality of rectangular panels arranged in an array. The rectangular panels may be separately formed from one another. Alternatively, the substrate may be in the form of a larger sheet of material, such as paperboard, that is diecut with horizontal and vertical slots to form an array of rectangular sections arranged in horizontal rows and vertical columns. A transparent, flexible material is mounted on at least one of the surface of the substrate. The transparent material has selected intelligence reverse printed thereon such that the printed material is interposed between the substrate and the flexible material. In one embodiment, the transparent material is mounted on both the upper and lower surfaces of the substrate. A layer of opaque material may be interposed between the flexible material and the substrate. The selected intelligence may include a map, words, graphics and the like.

DETAILED DESCRIPTION OF THE INVENTION

Figure 1:
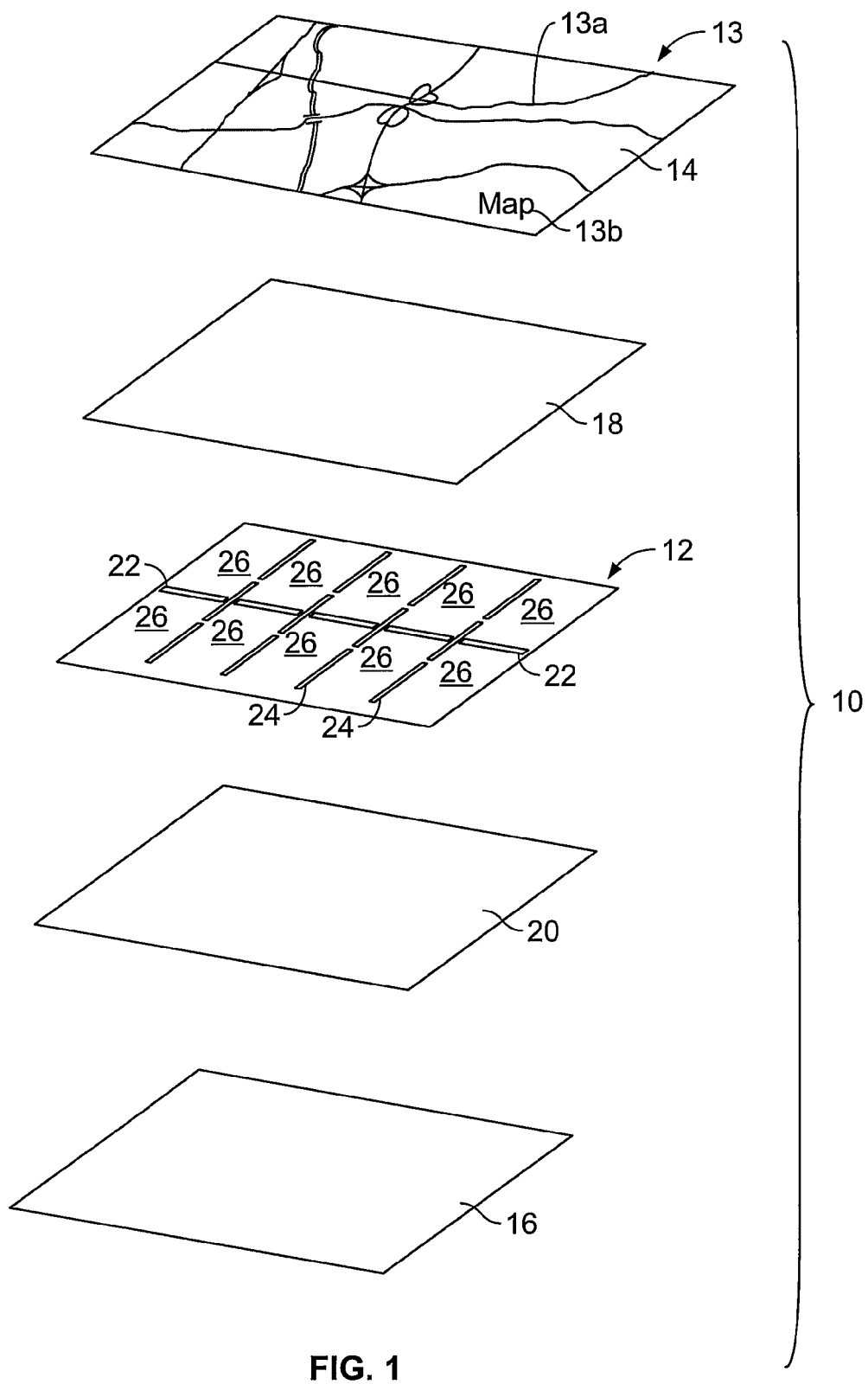
FIGS. 1 and 2 illustrate a multiple fold product according to a first embodiment of the present invention.
Figure 2:
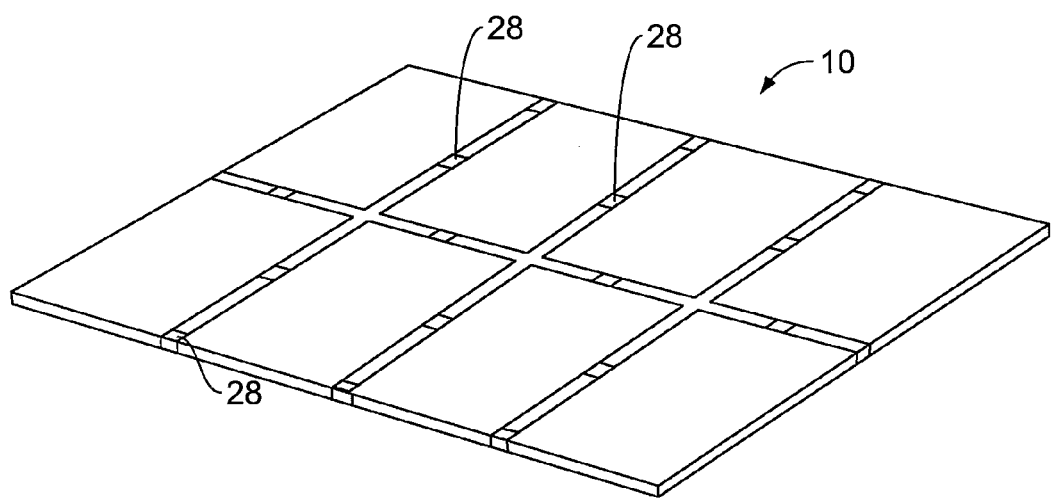

FIGS. 1 and 2 illustrate a multiple fold product 10 according to a first embodiment of the present invention. In the illustrated embodiment, the product 10 comprises a map. However, the methods described herein are equally applicable to a variety of folded products including game boards, charts, informational products, educational tools, etc.

The product 10 includes relatively rigid substrate 12 or board such as 12 pt paperboard, upper and lower flexible sheets 14, 16, and upper and lower layers of opaque coating 18, 20. The upper and lower flexible sheets 14, 16 comprise a transparent, flexible material such as 120-gauge polypropylene. It should be understood, however, that alternative materials can be employed for the components of the product 10. For example, the substrate 12 could be formed of a plastic, such as styrene. Such a material is impervious to moisture and is particularly well-suited for marine applications and water sports, such as scuba diving. Selected intelligence 13, such as a map 13a, words 13b, graphics, and the like, is reverse printed on the lower surface of the upper flexible sheet and the upper surface of the lower flexible sheets, which are subsequently adhered or otherwise mounted to the rigid substrate. The printing is preferably a four color print. The layers of a white opaque coating 18, 20 are interposed between the flexible sheets 14, 16 and the rigid substrate 12. The opaque coating 18, 20 may be applied to the flexible sheets 14, 16.

Alternatively or additionally the opaque coating 18, 20 may be applied to the upper and lower surfaces of the rigid substrate 12. An adhesive is preferably used to mount the flexible sheets 14, 16 to the substrate 12. The adhesive that is used to adhere the flexible sheets 14, 16 to the rigid substrate 12 may also be white.

Prior to application of the flexible sheets 14, 16, the rigid substrate 12 is diecut and striped with slots that are positioned where the product is to fold. The diecutting results in a series of horizontal slots 22 and vertical slots 24 which divide the rigid substrate 12 into an array of rectangular sections 26. The diecutting also results in tabs 28 that extend between and interconnect the adjacent rectangular sections 26. Alternatively, the rigid substrate 12 can be comprised of a series of separately formed panels such as described in the aforementioned 429 and 227 patents. In the illustrated embodiment, the diecutting results in an array of rectangular panels arranged in a plurality of horizontal rows (two shown) and a plurality of vertical columns (five shown). It will be appreciated, however, that fewer or a greater number of columns and/or rows may be employed depending on the application. For example, in the context of a board game, it may be desirable to only divide the substrate 12 into two sections.

The flexible sheets 14, 16 may be mounted to the substrate 12 using a sheetfeed mounter or continuously on a web roll. Once the flexible sheets 14, 16, with the selected intelligence printed thereon, are adhered to the rigid substrate 12, the product 10 is trimmed to a finished size. Although printed material is shown on both sides of the product 10, it will be appreciated that in some applications, such as certain board games there may only be printed material on one surface, e.g., the upper surface, of the product. In such applications, it may be desirable to eliminate the lower flexible sheet or replace it with a non-transparent or otherwise colored sheet.

The finished image is continuous and folds easily along the internal diecut seams. The reverse printed image is visible through the transparent flexible sheets 14, 16; however, the diecut channels are not noticeable because the printed sheets 14, 16 an have opaque coating 18, 20 between the substrate 12 and printed sheets 14, 16. Folds occur naturally along the diecut channels 22, 24 enabling an extremely large product to be quickly folded in any folding sequence and lie flat.

According to an alternative embodiment, the map or other selected intelligence is printed directly on the outer surface an opaque white flexible plastic such as 120-gauge polypropylene. Subsequently, a layer of clear (transparent) write-on-wipe-off coating can be applied over the top printed material. This layer protects the printed surface and enables people to draw on the printed material, e.g. the map, and subsequently erase the markings. The printed white opaque sheet is the mounted to a rigid substrate, such as the slotted board described above. This method similarly results in a finished product that is rigid yet folds easily.

The invention claimed is:

1. A multiple fold product, comprising:
   a relatively rigid substrate having upper and lower surfaces, the substrate comprising an array of interconnected rectangular sections that are arranged in horizontal rows and vertical columns and which are divided by horizontal and vertical slots;
   a first transparent, flexible sheet mounted on the upper surface of the substrate, the transparent material having selected intelligence reverse printed on its lower surface such that the selected intelligence is interposed between the substrate and the flexible material;
   a second transparent, flexible sheet mounted on the lower surface of the substrate, the transparent material having selected intelligence reverse printed on its upper surface such that the selected intelligence is interposed between the substrate and the flexible material; and
   layers of opaque material interposed between the transparent sheets and the substrate.

2. A multiple fold product as set forth in claim 1, wherein the horizontal and vertical slots are diecut into the substrate.

3. A multiple fold product as set forth in claim 1, wherein the substrate comprises paperboard.

4. A multiple fold product as set forth in claim 1, wherein the product is a map.

5. A multiple fold product as set forth in claim 1, wherein the product is a game board.

6. A multiple fold product as set forth in claim 1, wherein the substrate comprises plastic.

7. A method of making a multiple fold product, comprising the steps of:
   providing a relatively rigid substrate having upper and lower surfaces, the substrate comprising an array of interconnected rectangular sections that are arranged in horizontal rows and vertical columns and which are divided by horizontal and vertical slots;
   mounting a first transparent, flexible sheet on the upper surface of the substrate, the transparent material having selected intelligence reverse printed on its lower surface such that the selected intelligence is interposed between the substrate and the flexible material;
   mounting a second transparent, flexible sheet on the lower surface of the substrate, the transparent material having selected intelligence reverse printed on its upper surface such that the selected intelligence is interposed between the substrate and the flexible material; and
   interposing layers of opaque material between the transparent sheets and the substrate.

8. A method as set forth in claim 7, further comprising diecutting horizontal and vertical slots in the substrate to allow the substrate to be folded.

\* \* \* \* \*